(12) United States Patent
Inoue et al.

(10) Patent No.: US 12,459,614 B2
(45) Date of Patent: Nov. 4, 2025

(54) SYSTEM FOR AND METHOD OF CONTROLLING WATERCRAFT

(71) Applicant: YAMAHA HATSUDOKI KABUSHIKI KAISHA, Iwata (JP)

(72) Inventors: Hiroshi Inoue, Shizuoka (JP); Ryota Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 277 days.

(21) Appl. No.: 17/982,714

(22) Filed: Nov. 8, 2022

(65) Prior Publication Data
US 2023/0249788 A1 Aug. 10, 2023

(30) Foreign Application Priority Data
Feb. 8, 2022 (JP) .................................. 2022-018277

(51) Int. Cl.
| B63B 79/40 | (2020.01) |
| B63B 79/10 | (2020.01) |
| B63B 79/30 | (2020.01) |
| G07C 5/00 | (2006.01) |
| G07C 5/08 | (2006.01) |

(52) U.S. Cl.
CPC .............. *B63B 79/40* (2020.01); *B63B 79/10* (2020.01); *B63B 79/30* (2020.01); *G07C 5/008* (2013.01); *G07C 5/0808* (2013.01)

(58) Field of Classification Search
None
See application file for complete search history.

(56) References Cited

U.S. PATENT DOCUMENTS

| 10,322,786 | B1 * | 6/2019 | Anschuetz | .............. F02D 41/40 |
| 2012/0282828 | A1 | 11/2012 | Inoue | |
| 2013/0274954 | A1 | 10/2013 | Jordan, Jr. et al. | |
| 2014/0102168 | A1 | 4/2014 | Kohn et al. | |
| 2017/0305369 | A1 * | 10/2017 | Ono | ..................... G07C 5/0825 |
| 2022/0035755 | A1 * | 2/2022 | Harper | .............. H04L 12/40104 |

FOREIGN PATENT DOCUMENTS

| EP | 3920151 A1 | 12/2021 |
| JP | 2013-199852 A | 10/2013 |
| KR | 20210114100 A * | 9/2021 |

OTHER PUBLICATIONS

Extended European Search Report in EP22206689.6, mailed Jun. 10, 2023, 8 pages.

* cited by examiner

Primary Examiner — Vivek D Koppikar
Assistant Examiner — David Ruben Pedersen
(74) Attorney, Agent, or Firm — Keating & Bennett, LLP

(57) ABSTRACT

A system for a watercraft includes an engine sensor, a status sensor, and a watercraft operating controller. The engine sensor is operable to detect a rotational speed of the engine. The status sensor is operable to detect status data indicating a status of the watercraft. The watercraft operating controller is configured or programmed to determine that an actual operation of the marine propulsion device has been started after shipment of the marine propulsion device, obtain the status data when the rotational speed of the engine reaches a first rotational speed range for the first time after a start of the actual operation of the marine propulsion device, and record the status data when the rotational speed of the engine reaches the first rotational speed range for the first time after the start of the actual operation of the marine propulsion device as initial status data.

17 Claims, 4 Drawing Sheets

SYSTEM FOR AND METHOD OF CONTROLLING WATERCRAFT

CROSS REFERENCE TO RELATED APPLICATIONS

This application claims the benefit of priority to Japanese Patent Application No. 2022-018277 filed on Feb. 8, 2022. The entire contents of this application are hereby incorporated herein by reference.

BACKGROUND OF THE INVENTION

1. Field of the Invention

The present invention relates to a system for and a method of controlling a watercraft.

2. Description of the Related Art

There is a type of system for controlling a watercraft that obtains status data indicating a status of the watercraft and determines a malfunction of the watercraft based on the status data. For example, Japan Laid-open Patent Application Publication No. 2013-199852 describes that an ECU obtains values of temperature and pressure of a lubricating oil of an engine. The ECU has stored normal values of temperature and pressure of the lubricating oil. The ECU determines whether or not the lubricating oil has deteriorated by comparison between the obtained values and the normal values of temperature and pressure of the lubricating oil. When it is determined that the lubricating oil has deteriorated, the ECU causes an informing device to inform of oil replacement.

Because of individual differences among watercraft, the normal values of the status data are not necessarily true of all watercraft. Therefore, when the deterioration is determined with the normal values preliminarily set in the ECU as described above, accuracy in the determination still has room for enhancement.

SUMMARY OF THE INVENTION

Preferred embodiments of the present invention increase accuracy in determining a malfunction of a watercraft.

A system according to a preferred embodiment of the present invention relates to a system for controlling a watercraft. The watercraft includes a marine propulsion device including an engine. The system includes an engine sensor, a status sensor, and a controller. The engine sensor is operable to detect a rotational speed of the engine. The status sensor is operable to detect status data indicating a status of the watercraft. The controller is configured or programmed to obtain the rotational speed of the engine, determine whether or not an actual operation of the marine propulsion device has been started after shipment of the marine propulsion device, determine whether or not the rotational speed of the engine reaches a first rotational speed range for the first time after a start of the actual operation of the marine propulsion device, obtain the status data when the rotational speed of the engine reaches the first rotational speed range for the first time after the start of the actual operation of the marine propulsion device, and record the status data when the rotational speed of the engine reaches the first rotational speed range for the first time after the start of the actual operation of the marine propulsion device as initial status data in the first rotational speed range.

A method according to another preferred embodiment of the present invention relates to a method of controlling a watercraft. The watercraft includes a marine propulsion device including an engine. The method includes obtaining a rotational speed of the engine, obtaining status data indicating a status of the watercraft, determining whether or not an actual operation of the marine propulsion device has been started after a shipment of the marine propulsion device, determining whether or not the rotational speed of the engine reaches a first rotational speed range for the first time after a start of the actual operation of the marine propulsion device, and recording the status data when the rotational speed of the engine reaches the first rotational speed range for the first time after the start of the actual operation of the marine propulsion device as initial status data in the first rotational speed range.

According to a preferred embodiment of the present invention, the status data, obtained when the rotational speed of the engine reaches the first rotational speed range for the first time after the start of the actual operation of the marine propulsion device, is recorded as the initial status data in the first rotational speed range. The initial status data indicates the status data in a normal condition, while reflecting individual differences among watercraft. Therefore, the accuracy in determining a malfunction of the watercraft is enhanced with the initial status data.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
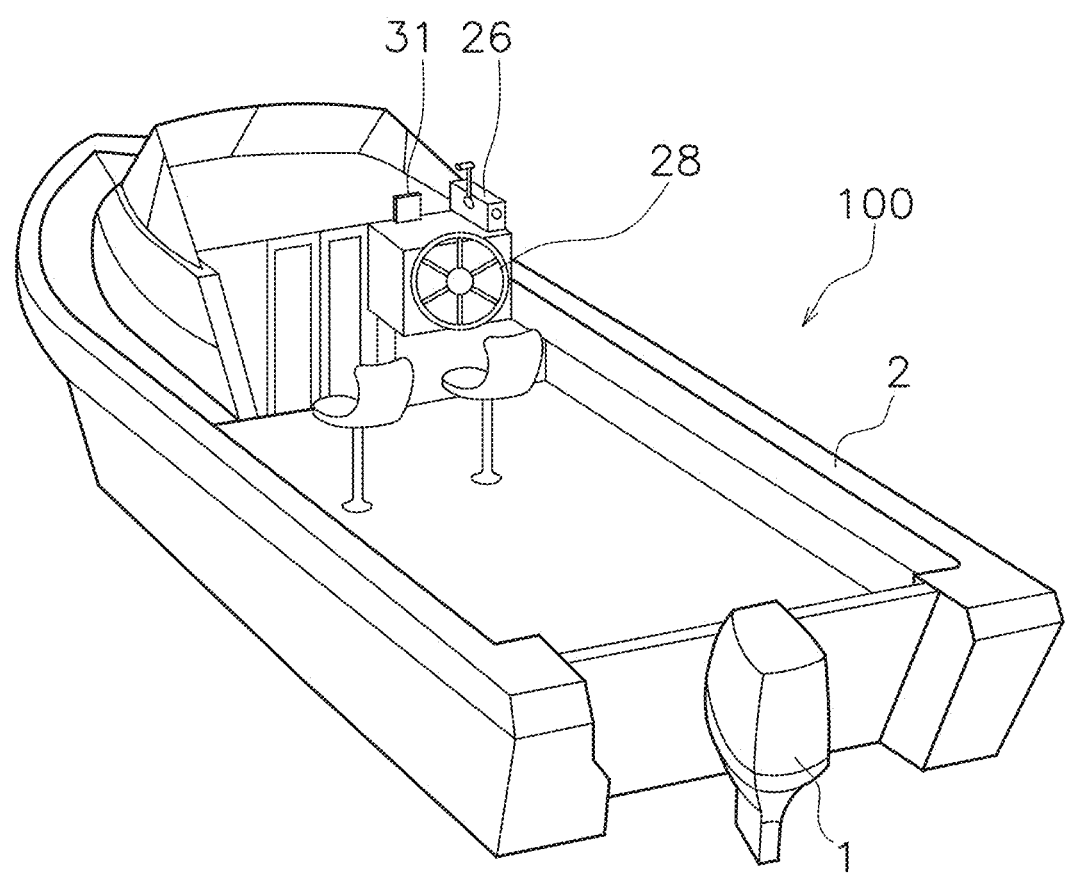
FIG. 1 is a perspective view of a watercraft according to a preferred embodiment of the present invention.

Preferred embodiments of the present invention will be hereinafter explained with reference to the drawings. FIG. 1 is a perspective view of a watercraft 100 according to a preferred embodiment of the present invention. The watercraft 100 includes a marine propulsion device 1 and a vessel body 2. The marine propulsion device 1 is attached to the stern of the vessel body 2. The marine propulsion device 1 generates a thrust to propel the watercraft 100. In the present preferred embodiment, the marine propulsion device 1 is an outboard motor.

Figure 2:
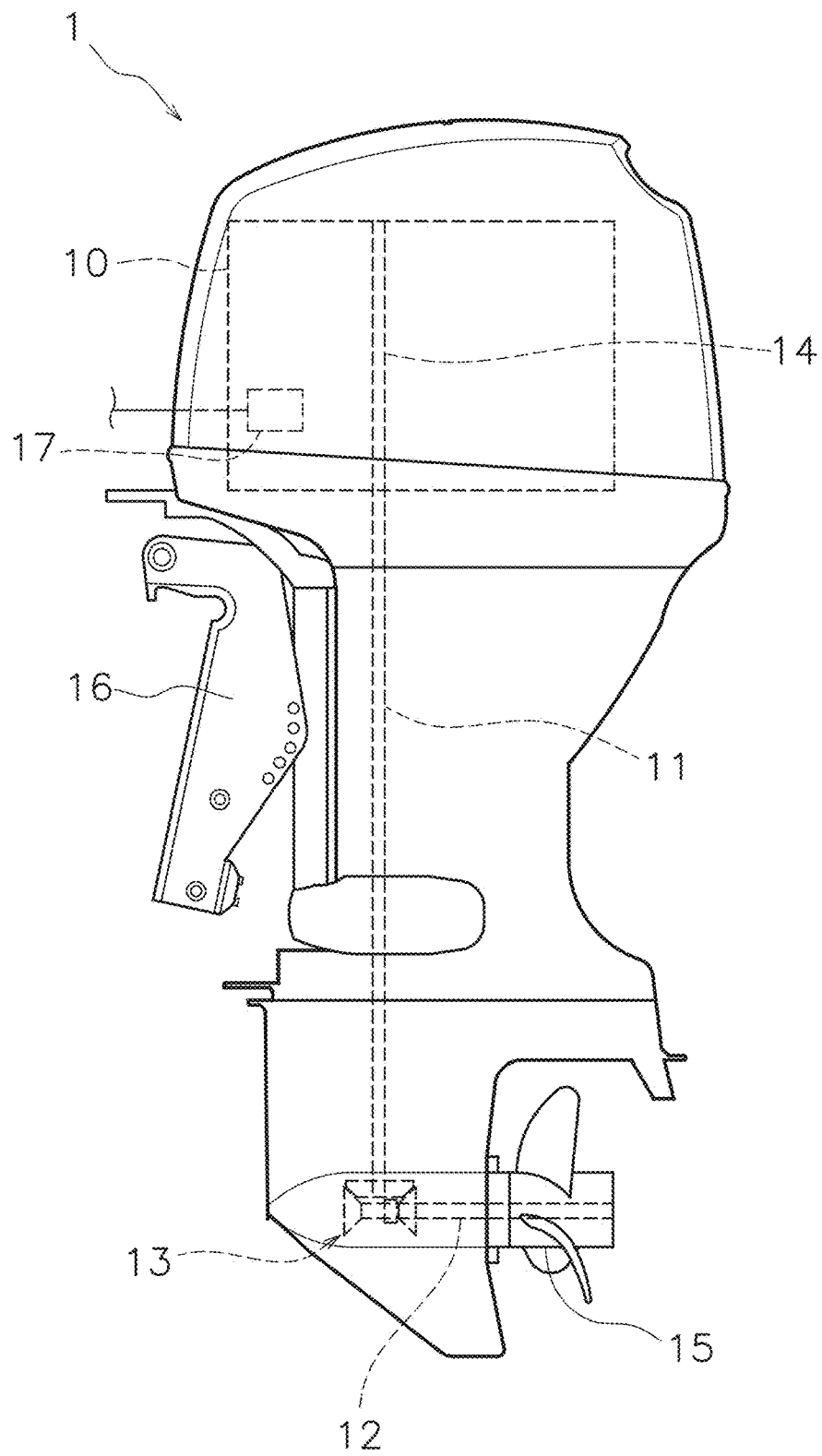
FIG. 2 is a side view of a marine propulsion device.

FIG. 2 is a side view of the marine propulsion device 1. As shown in FIG. 2, the marine propulsion device 1 includes an engine 10, a drive shaft 11, a propeller shaft 12, and a shift mechanism 13. The engine 10 generates the thrust to propel the watercraft 100. The engine 10 includes a crankshaft 14. The crankshaft 14 extends in the vertical direction. The drive shaft 11 is connected to the crankshaft 14. The drive shaft 11 extends in the vertical direction. The drive shaft 11 extends downward from the engine 10.

The propeller shaft 12 extends in the back-and-forth direction of the marine propulsion device 1. The propeller shaft 12 is connected to the drive shaft 11 through the shift mechanism 13. A propeller 15 is connected to the propeller shaft 12. The shift mechanism 13 switches the rotational direction of mechanical power to be transmitted from the drive shaft 11 to the propeller shaft 12. The shift mechanism 13 includes, for instance, a plurality of gears and a clutch that changes meshing of the gears. The marine propulsion device 1 is attached to the watercraft 100 through a bracket 16.

The marine propulsion device 1 includes an ECU (Engine Control Unit) 17. The ECU 17 electrically controls the engine 10. The ECU 17 includes a processor such as a CPU (Central Processing Unit) and memories such as a RAM (Random Access Memory) and a ROM (Read Only Memory).

Figure 3:
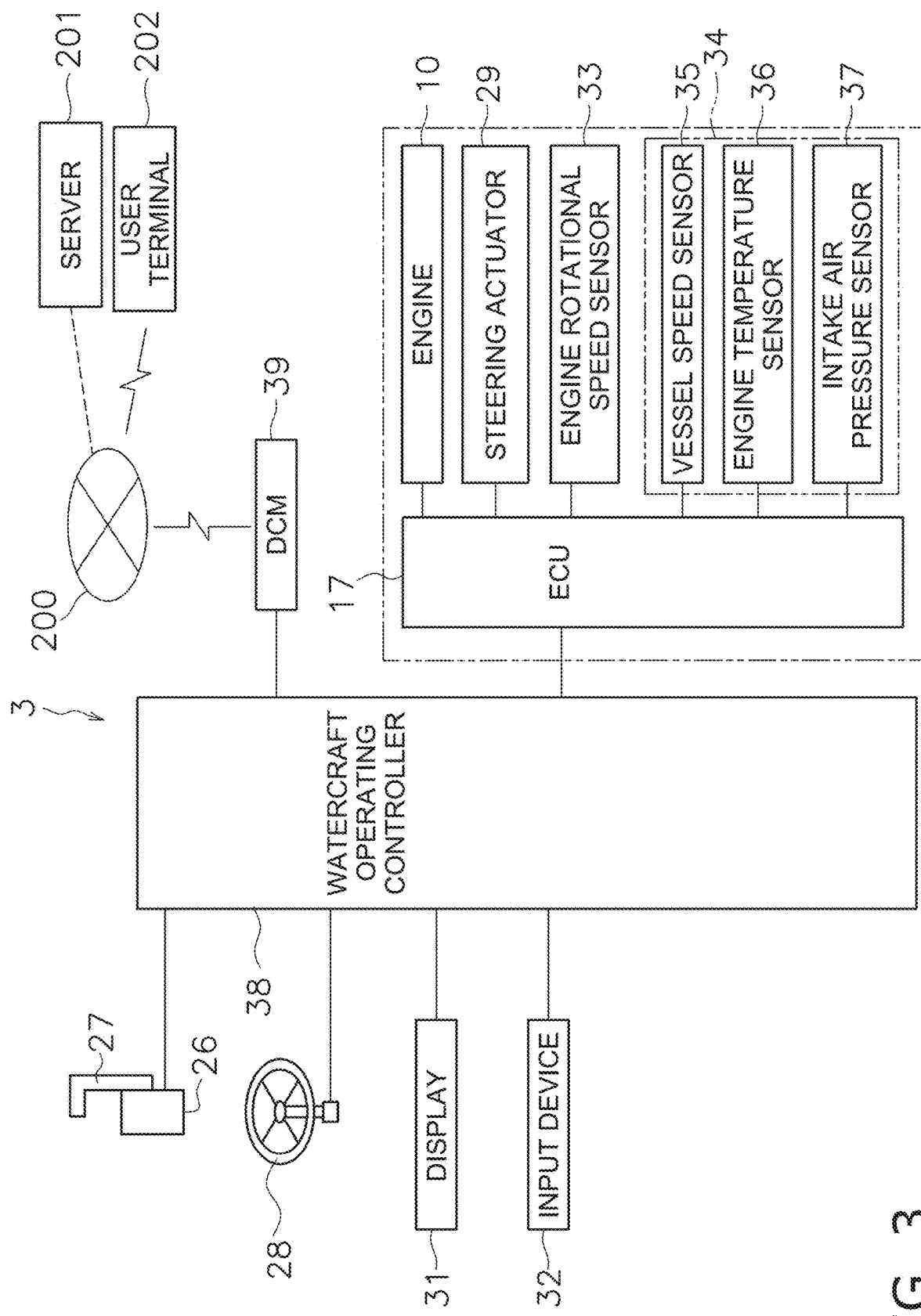
FIG. 3 is a schematic diagram of a control system for the watercraft.

FIG. 3 is a schematic diagram for showing a configuration of a control system 3 for the watercraft 100. As shown in FIG. 3, the control system 3 includes a throttle-shift operating device 26. The throttle-shift operating device 26 is operable by an operator to regulate the rotational speed of the engine 10 in the marine propulsion device 1. The throttle-shift operating device 26 is also operable by the operator to switch forward movement and rearward movement of the marine propulsion device 1.

The throttle-shift operating device 26 includes a throttle lever 27. The throttle lever 27 is operable from a neutral position to a forward moving position and a rearward moving position. The throttle-shift operating device 26 outputs a throttle signal indicating the operating position of the throttle lever 27. The ECU 17 receives the throttle signal outputted from the throttle-shift operating device 26. The ECU 17 controls the shift mechanism 13 in accordance with the operating position of the throttle lever 27. Accordingly, the rotation of the propeller shaft 12 is switched between a forward moving direction and a rearward moving direction. The ECU 17 controls the engine rotational speed in accordance with the operating position of the throttle lever 27.

The control system 3 includes a steering operating device 28 and a steering actuator 29. The steering actuator 29 turns the marine propulsion device 1 right and left so as to change the rudder angle of the marine propulsion device 1. The steering actuator 29 includes, for instance, an electric motor. Alternatively, the steering actuator 29 may include an electric pump and a hydraulic cylinder.

The steering operating device 28 is operable by the operator to adjust the rudder angle of the marine propulsion device 1. The steering operating device 28 includes, for instance, a steering wheel. Alternatively, the steering operating device 28 may be another type of operating device such as a joystick. The steering operating device 28 is operable right and left from a neutral position. The steering operating device 28 outputs a steering signal indicating the operating position thereof. The steering actuator 29 is controlled in accordance with the operating position of the steering operating device 28, such that the rudder angle of the marine propulsion device 1 is controlled.

The control system 3 includes a display 31 and an input device 32. The display 31 displays information regarding the marine propulsion device 1. The display 31 displays an image in response to an image signal inputted thereto. The input device 32 receives an operational input from a user. The input device 32 outputs an input signal indicating the operational input by the user. The input device 32 includes, for instance, a touchscreen. It should be noted that the input device 32 may include a hardware key.

The control system 3 includes an engine rotational speed sensor 33 and a status sensor 34. The engine rotational speed sensor 33 and the status sensor 34 are attached to the watercraft 100. The engine rotational speed sensor 33 outputs a signal indicating engine rotational speed data. The engine rotational speed data indicates the rotational speed of the engine 10. The status sensor 34 outputs a signal indicating status data. The status data indicates the status of the watercraft 100.

For example, the status sensor 34 includes a vessel speed sensor 35, an engine temperature sensor 36, and an intake air pressure sensor 37. The vessel speed sensor 35 outputs a signal indicating vessel speed data. The vessel speed data indicates the vessel speed of the watercraft 100. The engine temperature sensor 36 outputs a signal indicating engine temperature data. The engine temperature data indicates the temperature of the engine 10. The temperature of the engine 10 is, for instance, the cooling water temperature of the engine 10. Alternatively, the temperature of the engine 10 may be the wall temperature of the engine 10. The intake air pressure sensor 37 outputs a signal indicating intake air pressure data. The intake air pressure data indicates the intake air pressure of the engine 10.

The status data include the vessel speed data, the engine temperature data, and the intake air pressure data. The status data also includes cumulative operating time of the engine 10. The cumulative operating time of the engine 10 refers to the sum of the operating time of the engine 10 from shipment of the marine propulsion device 1. Moreover, the status data may include data that indicates any other status of the watercraft 100.

The control system 3 includes a watercraft operating controller 38 and a data communication module (hereinafter referred to as DCM) 39. The watercraft operating controller 38 includes a processor such as a CPU, memories such as a RAM and a ROM, and a storage such as an HDD (Hard Disk Drive) or an SSD (Solid State Drive). The watercraft operating controller 38 stores programs and data to control the marine propulsion device 1. The watercraft operating controller 38 is connected to the ECU 17 through wired or wireless communication. The watercraft operating controller 38 is connected to the throttle-shift operating device 26 and the steering operating device 28 through wired or wireless communication.

The watercraft operating controller 38 receives the input signal outputted from the input device 32. The watercraft operating controller 38 sets the control of the marine propulsion device 1 in response to the input signal. The watercraft operating controller 38 outputs the image signal to the display 31 and causes the display 31 to display the information regarding the marine propulsion device 1.

The DCM 39 performs wireless communication with an external computer. The DCM 39 includes a processor such as a CPU, memories such as a RAM and a ROM, and an auxiliary storage device such as an HDD or an SSD. The DCM 39 is configured to perform data transmission with the external computer through a mobile communication network 200. The mobile communication network 200 is, for instance, a network of a 3G, 4G, or 5G mobile communication system.

The DCM 39 is communicable with a server 201. The DCM 39 is communicable with a user terminal 202. The user terminal 202 may be, for instance, a smartphone, a tablet, or a personal computer. The DCM 39 may be communicable with the user terminal 202 through the server 201.

The watercraft operating controller 38 collects watercraft data regarding the watercraft 100 and sends the collected watercraft data to the server 201 through the DCM 39. The watercraft data includes the engine rotational speed data and the status data. The watercraft operating controller 38 collects the status data from the status sensor 34. For example, the watercraft operating controller 38 obtains the vessel speed data from the vessel speed sensor 35. The watercraft operating controller 38 obtains the engine temperature data from the engine temperature sensor 36. The watercraft operating controller 38 obtains the intake air pressure data from the intake air pressure sensor 37. The watercraft operating controller 38 obtains and records the status data at predetermined first intervals of time. The watercraft operating controller 38 sends the stored watercraft data to the server 201 at predetermined intervals of time.

The server 201 determines whether or not a malfunction of the watercraft 100 is occurring based on the watercraft data. For example, the server 201 determines whether or not overheating of the engine 10 is occurring based on the engine temperature data. For example, when the temperature of the engine 10 is greater than or equal to a predetermined threshold of temperature, the server 201 determines that overheating of the engine 10 is occurring.

The server 201 determines whether or not a malfunction of the watercraft 100 is occurring by comparing the status data described above (hereinafter referred to as general status data) with initial status data. The watercraft operating controller 38 sends the status data, obtained in an initial phase of using the marine propulsion device 1 after the shipment of the marine propulsion device 1, as the initial status data to the server 201. The server 201 records and keeps the initial status data and determines whether or not a malfunction of the watercraft 100 is occurring by comparing the general status data with the initial status data. For example, the server 201 determines whether or not a malfunction of the watercraft 100 is occurring by comparing an actual vessel speed obtained when the rotational speed of the engine 10 falls in a predetermined rotational speed range with a vessel speed obtained when the rotational speed of the engine 10 falls in the predetermined rotational speed range in the initial status data.

When determining that a malfunction of the watercraft 100 is occurring, the server 201 causes the display 31 to display an alert. Alternatively, when determining that a malfunction of the watercraft 100 is occurring, the watercraft operating controller 38 may turn on a warning lamp.

Figure 4:
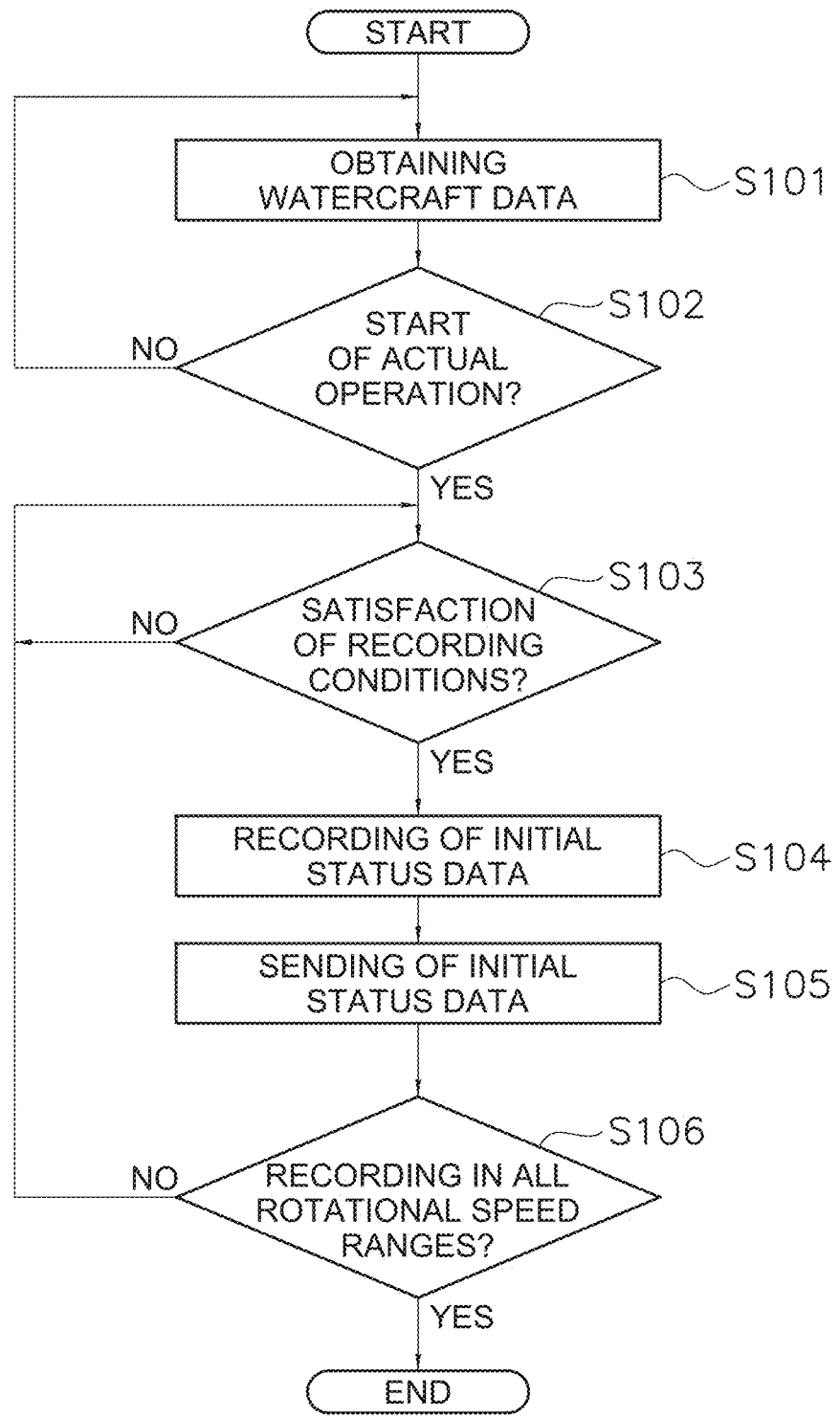
FIG. 4 is a flowchart of a series of processes for obtaining initial status data.

FIG. 4 is a flowchart of a series of processes for obtaining the initial status data. The watercraft operating controller 38 starts executing the series of processes shown in FIG. 4 when the marine propulsion device 1, attached to the watercraft 100, is activated for the first time after the shipment thereof. For example, the watercraft operating controller 38 starts executing the series of processes shown in FIG. 4 when the engine 10 is started for the first time after the shipment of the marine propulsion device 1. As shown in FIG. 4, in step S101, the watercraft operating controller 38 obtains the watercraft data.

In step S102, the watercraft operating controller 38 determines whether or not an actual operation has been started. Determining whether or not the actual operation has been started herein refers to determining whether or not an operation of the marine propulsion device 1 has been started by a user of the marine propulsion device 1 for the first time after the shipment. For example, the watercraft operating controller 38 determines that the actual operation has been started when a load of the engine 10 has changed to be greater than or equal to a predetermined threshold of load, while the cumulative operating time of the engine 10 is less than or equal to a predetermined threshold of time. The load of the engine 10 refers to, for instance, the rotational speed and the intake air pressure of the engine 10.

When the watercraft operating controller 38 determines that the actual operation has been started, the process proceeds to step S103. In step S103, the watercraft operating controller 38 determines whether or not a recording condition of the initial status data is satisfied. The recording condition includes that the rotational speed of the engine 10 falls in a predetermined rotational speed range, and simultaneously, a steady operation is being performed. For example, the watercraft operating controller 38 determines that the steady operation is being performed when a change in rotational speed of the engine 10 has been continuously small for a predetermined length of time, while a change in throttle opening degree is subtle.

The watercraft operating controller 38 determines whether or not the recording condition is satisfied in each of a plurality of predetermined rotational speed ranges. The plurality of predetermined rotational speed ranges include a first rotational speed range and a second rotational speed range. The watercraft operating controller 38 determines that the recording condition is satisfied when the rotational speed of the engine 10 falls in the first rotational speed range, and simultaneously, the steady operation is being performed. The watercraft operating controller 38 determines that the recording condition is satisfied when the rotational speed of the engine 10 falls in the second rotational speed range, and simultaneously, the steady operation is being performed. The second rotational speed range is higher in rotational speed than the first rotational speed range. The plurality of rotational speed ranges may include a rotational speed range including a rotational speed of the engine 10 operated at full throttle.

When the recording condition is satisfied, the process proceeds to step S104. In step S104, the watercraft operating controller 38 records the initial status data. The watercraft operating controller 38 records the initial status data at second intervals of time. Each second interval of time is shorter than each first interval of time. Therefore, the watercraft operating controller 38 obtains and records the initial status data at shorter intervals of time than when obtaining and recording the general status data. The watercraft operating controller 38 records the status data obtained at second intervals of time for a predetermined length of time as the initial status data. Therefore, the initial status data are obtained at shorter sampling intervals than the general status data, and thus, is detailed data that includes more data than the general status data. For example, the watercraft operating controller 38 records the general status data at intervals of about 1 minute, for example. The watercraft operating controller 38 records the status data, obtained at intervals of about 0.1 seconds for about 10 seconds, for example, as the initial status data.

The watercraft operating controller 38 records the initial status data in each of the plurality of predetermined rotational speed ranges described above. For example, the watercraft operating controller 38 records the initial status data in the first rotational speed range. The watercraft operating controller 38 records the initial status data in the second rotational speed range.

It should be noted that as described above, when the load of the engine 10 has changed to be greater than or equal to the predetermined threshold of load, while the cumulative operating time of the engine 10 is less than or equal to the predetermined threshold of time, the watercraft operating controller 38 determines that the actual operation has been started and then records the initial status data. As long as the cumulative operating time of the engine 10 is less than or equal to the predetermined threshold of time, the watercraft operating controller 38 may thereafter update the initial status data when the load of the engine 10 has changed to be greater than or equal to the predetermined threshold of load based on the determination that the actual operation has been started. When the cumulative operating time of the engine 10 becomes greater than the predetermined threshold of time, the watercraft operating controller 38 does not update the initial status data even when the load of the engine 10 has changed to be greater than or equal to the predetermined threshold of load.

The threshold of time is, for instance, greater than a length of time required for a test operation of the engine 10 before a shipment of the marine propulsion device 1 or a length of time required for propeller matching work at a dealer and is set to be, for instance, 10 hours. Because of this, even when erroneously determining that the actual operation has been started due to the test operation of the engine 10 before the shipment or the propeller matching work at the dealer, the watercraft operating controller 38 is able to thereafter update the initial status data when the actual operation is started in reality. In other words, the status data obtained in the test operation or in the propeller matching work is prevented from being recorded erroneously as the initial status data.

It should be noted that the watercraft operating controller 38 may determine that the propeller 16 has been changed or replaced when the load of the engine 10 has sharply changed after a stop of the engine 10. The watercraft operating controller 38 may determine that the propeller 15 has been changed or replaced when the load of the engine 10 has changed a plurality of times in a day. When determining that the propeller 15 has been changed or replaced, the watercraft operating controller 38 may inform a user of a notification to encourage the user to perform an operation to reset the initial status data. The notification is displayed on, for instance, the display 31 or the user terminal 202. The resetting operation is performed with, for instance, the input device 32 or the user terminal 202. When the user has performed the resetting operation, the watercraft operating controller 38 may record anew or update the initial status data based on the determination that the actual operation has been started.

In step S105, the watercraft operating controller 38 sends the initial status data to the server 201 through the DCM 39. The server 201 receives the initial status data in each rotational speed range from the DCM 39 and stores the initial status data. The server 201 stores the received initial status data in each rotational speed range in association with an identifier assigned to the watercraft 100, the DCM 39, or the marine propulsion device 1.

In step S106, the watercraft operating controller 38 determines whether or not the initial status data in all the rotational speed ranges have been recorded. When the initial status data in all the plurality of predetermined rotational speed ranges described above have been recorded, the watercraft operating controller 38 determines that the initial status data in all the rotational speed ranges have been recorded. When the initial status data in all the rotational speed ranges have been recorded, the watercraft operating controller 38 ends the series of processes for obtaining the initial status data.

When the initial status data in all the rotational speed ranges have not been recorded yet, the process returns to step S103. In steps S103 to S105, the watercraft operating controller 38 continues to determine whether or not the recording condition is satisfied and obtain, record, and send the initial status data. However, the watercraft operating controller 38 does not obtain the initial status data in a given rotational speed range when recording of the initial status data in the given rotational speed range has been completed.

In the control system 3 according to a preferred embodiment of the present invention, the status data, obtained when the actual operation of the marine propulsion device 1 has been started after the shipment thereof and then the rotational speed of the engine 10 falls in a predetermined rotational speed range for the first time after the start of the actual operation, is stored as the initial status data in the predetermined rotational speed range. The initial status data indicates the status data of the watercraft 100 in the normal condition, while reflecting individual differences among watercraft. Therefore, the accuracy in determining a malfunction of the watercraft 100 is enhanced with the initial status data.

Preferred embodiments of the present invention have been explained above. However, the present invention is not limited to the preferred embodiments described above, and a variety of changes can be made without departing from the gist of the present invention.

The marine propulsion device 1 is not limited to the outboard motor, and alternatively, may be another type of propulsion device such as an inboard engine outboard drive or a jet propulsion device. The structure of the marine propulsion device 1 is not limited to that in the preferred embodiments described above and may be changed. The structure of the control system 3 is not limited to that in the preferred embodiments described above and may be changed. For example, the DCM 39 may be omitted.

An occurrence of malfunction may not be necessarily determined by the server 201, and alternatively, may be determined by a computer in the watercraft 100. For example, the occurrence of malfunction may be determined by the watercraft operating controller 38. Alternatively, the occurrence of malfunction may be determined by the DCM 39.

Components of the status data are not limited to those in the preferred embodiments described above. One or more of the components may be changed or omitted; alternatively, one or more other components may be added thereto. In the preferred embodiments described above, recording of the initial status data is automatically executed when the recording condition is satisfied. However, recording of the initial status data may be executed when the user terminal 202 is operated by the user.

The condition for determining that the actual operation of the marine propulsion device 1 has been started is not limited to that in the preferred embodiments described above and may be changed. For example, the watercraft operating controller 38 may determine that the actual operation of the marine propulsion device 1 has been started when the cumulative operating time of the engine 10 becomes greater than a predetermined length of time. In other words, the watercraft operating controller 38 may be configured not to record the initial status data even when the recording condition is satisfied before the cumulative operating time of the engine 10 reaches the predetermined length of time after the shipment of the marine propulsion device 1; by contrast, the watercraft operating controller 38 may be configured to record the initial status data when the recording condition is satisfied after the cumulative operating time of the engine 10 reaches the predetermined length of time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft including a marine propulsion device including an engine, the system comprising:
   an engine sensor to detect a rotational speed of the engine;
   a status sensor to detect status data indicating a status of the watercraft; and
   a controller configured or programmed to:
      obtain the rotational speed of the engine and a load of the engine, and determine that an actual operation of the marine propulsion device has been started when the load of the engine has firstly changed to be greater than or equal to a predetermined threshold of load after shipment of the marine propulsion device;
      determine that the rotational speed of the engine reaches a first rotational speed range for the first time after a start of the actual operation of the marine propulsion device;
      obtain the status data when the rotational speed of the engine reaches the first rotational speed range for the first time after the start of the actual operation of the marine propulsion device; and
      record the status data when the rotational speed of the engine reaches the first rotational speed range for the first time after the start of the actual operation of the marine propulsion device as initial status data in the first rotational speed range; wherein
   the initial status data indicates the status data of the engine in a normal condition and in an initial phase of using the marine propulsion device while reflecting individual differences among watercraft.

2. The system according to claim 1, wherein
   the controller is configured or programmed to:
      obtain and record the status data at first intervals of time as a general status data; and
      obtain and record the initial status data at second intervals of time, each of the second intervals of time being shorter than each of the first intervals of time.

3. The system according to claim 2, wherein the controller is configured or programmed to determine a malfunction of the watercraft by comparing the general status data with the initial status data.

4. The system according to claim 1, further comprising:
   a data communication module configured or programmed to communicate with an external computer; wherein
   the controller is configured or programmed to send the initial status data to the external computer through the data communication module.

5. The system according to claim 4, wherein the controller is configured or programmed to:
   obtain and record the status data at first intervals of time as a general status data;
   send the general status data to the external computer through the data communication module;
   obtain and record the initial status data at second intervals of time, each of the second intervals of time being shorter than each of the first intervals of time; and
   send the initial status data to the external computer through the data communication module.

6. The system according to claim 5, wherein the external computer is configured or programmed to determine a malfunction of the watercraft by comparing the general status data with the initial status data.

7. The system according to claim 1, wherein the controller is configured or programmed to:
   determine whether or not the rotational speed of the engine reaches a second rotational speed range higher than the first rotational speed range for the first time after the start of the actual operation of the marine propulsion device;
   obtain the status data when the rotational speed of the engine reaches the second rotational speed range for the first time after the start of the actual operation of the marine propulsion device; and
   record the status data when the rotational speed of the engine reaches the second rotational speed range for the first time after the start of the actual operation of the marine propulsion device as the initial status data in the second rotational speed range.

8. The system according to claim 1, wherein the controller is configured or programmed to:
   obtain a cumulative operating time of the engine; and
   record the initial status data when the cumulative operating time is less than or equal to a predetermined threshold of time and the load of the engine has changed to be greater than or equal to the predetermined threshold of load.

9. The system according to claim 1, wherein
   the marine propulsion device includes a propeller; and
   the controller is configured or programmed to:
      determine whether or not a change or replacement of the propeller has been made;
      when it is determined that the change or replacement of the propeller has been made, inform a user of the watercraft of a notification to encourage the user to perform an operation to reset the initial status data; and
      when the user has performed the operation to reset the initial status data, record anew the initial status data.

10. A method of controlling a watercraft including a marine propulsion device including an engine, the method comprising:
    obtaining a rotational speed of the engine and a load of the engine;
    obtaining status data indicating a status of the watercraft;
    determining that an actual operation of the marine propulsion device has been started when the load of the engine has firstly changed to be greater than or equal to a predetermined threshold of load after shipment of the marine propulsion device;
    determining that the rotational speed of the engine reaches a first rotational speed range for the first time after a start of the actual operation of the marine propulsion device; and
    recording the status data when the rotational speed of the engine reaches the first rotational speed range for the first time after the start of the actual operation of the marine propulsion device as initial status data in the first rotational speed range; wherein
    the initial status data the is data of the engine in a normal condition and in an initial phase of using the marine propulsion device while reflecting individual differences among watercraft.

11. The method according to claim 10, further comprising:
    obtaining and recording the status data at first intervals of time as a general status data; and
    obtaining and recording the initial status data at second intervals of time, each of the second intervals of time being shorter than each of the first intervals of time.

12. The method according to claim 11, further comprising:

determining a malfunction of the watercraft by comparing the general status data with the initial status data.

13. The method according to claim 10, wherein the watercraft further includes a data communication module configured or programmed to communicate with an external computer, the method further comprising:
sending the initial status data to the external computer through the data communication module.

14. The method according to claim 13, further comprising:
obtaining and recording the status data at first intervals of time as a general status data;
sending the general status data to the external computer through the data communication module;
obtaining and recording the initial status data at second intervals of time, each of the second intervals of time being shorter than each of the first intervals of time; and
sending the initial status data to the external computer through the data communication module.

15. The method according to claim 10, further comprising:
determining whether or not the rotational speed of the engine reaches a second rotational speed range higher than the first rotational speed range for the first time after the start of the actual operation of the marine propulsion device; and
recording the status data when the rotational speed of the engine reaches the second rotational speed range for the first time after the start of the actual operation of the marine propulsion device as the initial status data in the second rotational speed range.

16. The method according to claim 10, further comprising:
obtaining a cumulative operating time of the engine; and
recording the initial status data when the cumulative operating time is less than or equal to a predetermined threshold of time and the load of the engine has changed to be greater than or equal to the predetermined threshold of load.

17. The method according to claim 10, wherein the marine propulsion device includes a propeller, the method further comprising:
determining whether or not a change or replacement of the propeller has been made;
informing a user of the watercraft of a notification to encourage the user to perform an operation of resetting the initial status data when it is determined that the change or replacement of the propeller has been made; and
recording anew the initial status data when the user has performed the operation of resetting the initial status data.

* * * * *